(12) United States Patent
Lin

(10) Patent No.: US 10,659,668 B2
(45) Date of Patent: May 19, 2020

(54) FLASH DEVICE COMPRISING A PLURALITY OF LEDS, A FRESNEL LENS, AND A LENS ARRAY

(71) Applicant: Lumileds Holding B.V., Schiphol (NL)

(72) Inventor: Xueqin Lin, Shanghai (CN)

(73) Assignee: Lumileds Holding B.V., Schipol (NL)

( * ) Notice: Subject to any disclaimer, the term of this patent is extended or adjusted under 35 U.S.C. 154(b) by 0 days.

(21) Appl. No.: 16/154,044

(22) Filed: Oct. 8, 2018

(65) Prior Publication Data
US 2019/0109967 A1 Apr. 11, 2019

(30) Foreign Application Priority Data

Oct. 10, 2017 (WO) ................. PCT/CN2017/105477
Nov. 14, 2017 (EP) ..................................... 17201504

(51) Int. Cl.
| G02B 27/09 | (2006.01) |
| H04N 5/225 | (2006.01) |
| G02B 27/30 | (2006.01) |
| G02B 19/00 | (2006.01) |

(52) U.S. Cl.
CPC ....... H04N 5/2256 (2013.01); G02B 19/0014 (2013.01); G02B 19/0061 (2013.01); G02B 27/0927 (2013.01); G02B 27/0961 (2013.01); G02B 27/30 (2013.01); H04N 5/2252 (2013.01);
(Continued)

(58) Field of Classification Search
CPC .... G03B 27/0961; G02B 3/08; G02B 17/006; G02B 27/0961
See application file for complete search history.

(56) References Cited

U.S. PATENT DOCUMENTS

| 7,942,531 B2* | 5/2011 | Whitehead ............. G03B 21/60 353/30 |
| 9,507,985 B2* | 11/2016 | Chen .................. G06K 7/10732 |
| 9,519,206 B1* | 12/2016 | Norton ................. G03B 21/602 |

(Continued)

FOREIGN PATENT DOCUMENTS

| CN | 101013193 | 8/2007 |
| CN | 101676615 | 5/2012 |

(Continued)

OTHER PUBLICATIONS

Xu et al., "Optical design of rectangular illumination with freeform lenses for the application of LED road lighting," Frontiers of Optoelectronics, 10(4): 353-362 (2017).

(Continued)

*Primary Examiner* — Tung X Le
*Assistant Examiner* — Borna Alaeddini
(74) *Attorney, Agent, or Firm* — Schwegman Lundberg & Woessner, P.A.

(57) ABSTRACT

An apparatus is disclosed including: a light source; a Fresnel lens, and a lens array. The Fresnel lens is disposed upstream from the light source to collimate light output by the light source. The lens array is disposed upstream from the Fresnel lens to mix collimated light that is output from the Fresnel lens. The lens array includes a plurality of optical elements arranged on a substrate. Each optical element includes a respective first planar surface arranged to face towards a different respective portion of the Fresnel lens and a second convex surface arranged to face away from the Fresnel lens.

19 Claims, 14 Drawing Sheets

(52) U.S. Cl.
CPC ......... *H04N 5/2253* (2013.01); *H04N 5/2254* (2013.01)

(56) References Cited

U.S. PATENT DOCUMENTS

| | | | |
|---|---|---|---|
| 9,618,179 B2 | 4/2017 | Michiels et al. | |
| 2005/0174775 A1* | 8/2005 | Conner | G02B 27/0994 362/268 |
| 2006/0006344 A1* | 1/2006 | Boege | G01N 21/6452 250/458.1 |
| 2007/0041199 A1* | 2/2007 | Okada | F21V 5/045 362/326 |
| 2010/0150200 A1* | 6/2010 | Ho | G02B 3/08 372/50.23 |
| 2010/0278480 A1* | 11/2010 | Vasylyev | G02B 3/005 385/33 |
| 2013/0194795 A1* | 8/2013 | Onaka | F21V 5/04 362/231 |
| 2014/0118825 A1* | 5/2014 | Shikii | G02B 27/2214 359/465 |
| 2014/0160563 A1* | 6/2014 | Hasegawa | G02B 27/2214 359/463 |
| 2015/0253469 A1* | 9/2015 | Le Gros | G02B 3/0006 359/619 |
| 2016/0040854 A1* | 2/2016 | Zhang | H01L 25/0753 362/242 |
| 2016/0381264 A1 | 12/2016 | Qian et al. | |
| 2017/0123218 A1* | 5/2017 | Stigwall | G01C 3/18 |

FOREIGN PATENT DOCUMENTS

| | | |
|---|---|---|
| CN | 102360122 | 11/2013 |
| CN | 105049742 | 11/2015 |
| CN | 105650599 | 6/2016 |
| EP | 1754997 | 2/2007 |
| WO | WO-2019074929 A1 | 4/2019 |

OTHER PUBLICATIONS

Luo et al, "Design of compact and smooth free-form optical system with uniform illuminance for LED source," Opt. Express 18, 9055-9063 (2010).

"International Application Serial No. PCT/US2018/055020, International Search Report dated Nov. 29, 2018", 4 pgs.

"International Application Serial No. PCT/US2018/055020, Written Opinion dated Nov. 29, 2018", 7 pgs.

\* cited by examiner

FLASH DEVICE COMPRISING A PLURALITY OF LEDS, A FRESNEL LENS, AND A LENS ARRAY

FIELD OF INVENTION

The present disclosure relates to light emitting devices, in general, and more particularly to a lens for use in a flash device.

BACKGROUND

Light emitting diodes ("LEDs") are commonly used as light sources in various applications. LEDs are more energy-efficient than traditional light sources, providing much higher energy conversion efficiency than incandescent lamps and fluorescent light, for example. Furthermore, LEDs radiate less heat into illuminated regions and afford a greater breadth of control over brightness, emission color and spectrum than traditional light sources. These characteristics make LEDs an excellent choice for various lighting applications ranging from indoor illumination to flash photography.

Flash photography applications require LEDs to be used in conjunction with specialized optics for focusing light that is output from the LEDs. Such optics needs to meet various design constrains. For example, it needs to be sufficiently small to fit in small form-factor photographic devices, such as smartphones and miniature cameras. Furthermore, it needs to collimate light well in the direction of the subject that is being photographed, while also providing a highly uniform light output when multiple LEDs are used as a light source.

Accordingly, the need exists for improved optical designs that meet the above design-constraints.

SUMMARY

The present disclosure addresses this need. According to aspects of the disclosure, an apparatus is provided including: a light source; a Fresnel lens, and a lens array. The Fresnel lens is disposed upstream from the light source to collimate light output by the light source. The lens array is disposed upstream from the Fresnel lens to mix collimated light that is output from the Fresnel lens. The lens array includes a plurality of optical elements arranged on a substrate. Each optical element includes a respective first planar surface arranged to face towards a different respective portion of the Fresnel lens and a second convex surface arranged to face away from the Fresnel lens.

BRIEF DESCRIPTION OF THE DRAWINGS

The drawings described below are for illustration purposes only. The drawings are not intended to limit the scope of the present disclosure. Like reference characters shown in the figures designate the same parts in the various embodiments.

DETAILED DESCRIPTION

Figure 1A:
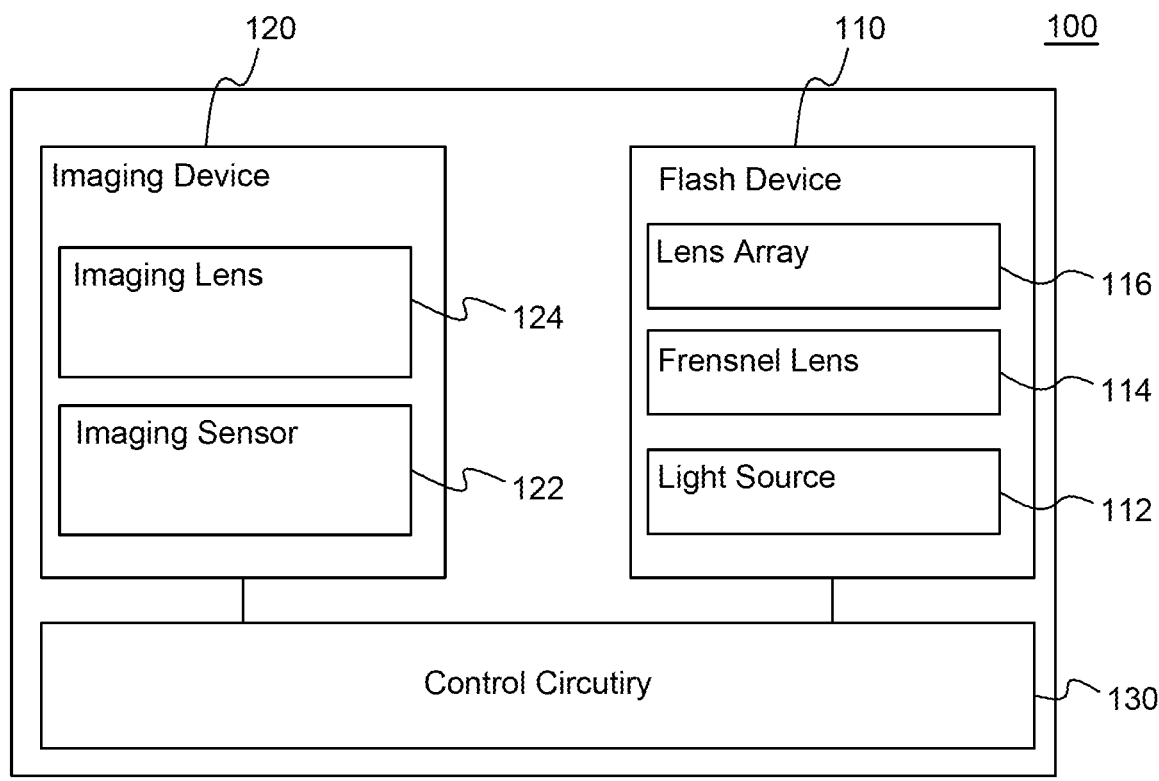
FIG. 1A is a schematic diagram of an example of a photographic system, according to aspects of the disclosure.

According to aspects of the disclosure, a photographic flash device is disclosed for use in smartphones. The flash device may include a light source, a Fresnel lens, and a lens array disposed on the light emitting surface of the Fresnel lens. The lens array may include a plurality of optical elements that are arranged on a substrate and it may be operable to condition light that is output from the flash device.

According to aspects of the disclosure, the lens array may cause the flash device to output light emissions having a highly-uniform color temperature. To achieve this result, each optical element in the lens array may be configured to produce a respective illumination spot that substantially overlaps with the illumination spots produced by the rest of the optical elements. When the light source includes multiple LEDs that produce different colors of light, superimposing the illuminations spots of the optical elements may cause the emissions from the LEDs to become mixed. This in turn may result in a combined light emission having a highly uniform color temperature.

According to aspects of the disclosure, the lens array may cause the flash device to produce an illumination spot that has a shape and aspect ratio that closely match the shape and aspect ratio of the imaging sensor in a camera. As is further discussed below, each optical element in the lens array may be configured to produce an illumination spot that has a rectangular shape and an aspect ratio that matches the aspect ratio of the imaging sensor by manipulating the shape and/or curvature of the optical element. The correspondence between the shapes and aspect ratios of the imaging sensor and the illumination spot produced by the flash device may result in an increased quality of images captured by the camera.

According to aspects of the disclosure, the lens array may cause the flash device to produce a highly uniform illuminance distribution pattern in the field-of-view of a camera the flash device is paired with. As discussed above, each optical element in the lens array may be configured to produce a respective illumination spot that substantially overlaps with the illumination spots produced by the rest of the optical elements. Superimposing the illumination spots produced by different optical elements in the lens array may cause the flash device to have a highly uniform illuminance distribution pattern.

According to aspects of the disclosure, an apparatus is disclosed comprising: a light source; a Fresnel lens disposed upstream from the light source to collimate light output by the light source; and a lens array disposed upstream from the Fresnel lens to mix collimated light that is output from the Fresnel lens, the lens array comprising a plurality of optical elements arranged on a substrate, each optical element including a respective first planar surface arranged to face towards a different respective portion of the Fresnel lens and a second convex surface arranged to face away from the Fresnel lens.

According to aspects of the disclosure, an apparatus is disclosed comprising: a housing enclosure having an aperture formed therein; a light source disposed inside the housing enclosure; a Fresnel lens disposed in the aperture to collimate light output by the light source; and a lens array disposed on the Fresnel lens to mix collimated light that is output from the Fresnel lens, the lens array comprising a plurality of optical elements arranged on a substrate, each optical element including a respective first planar surface arranged to face towards a different respective portion of the Fresnel lens and a second convex surface arranged to face away from the Fresnel lens.

According to aspects of the disclosure, an apparatus is disclosed comprising: a first light source for producing light having a first color temperature; a second light source for producing light having a second color temperature that is cooler than the first color temperature; a first lens assembly including a first Fresnel lens disposed upstream from the first light source to collimate light output by the first light source, and a first lens array disposed upstream from the first Fresnel lens to mix collimated light that is output from the first Fresnel lens, the first lens array comprising a plurality of first optical elements arranged on a first substrate; and a second lens assembly including a second Fresnel lens disposed upstream from the second light source to collimate light output by the second light source, and a second lens array disposed upstream from the second Fresnel lens to mix collimated light that is output from the second Fresnel lens, the second lens array comprising a plurality of second optical elements arranged on a second substrate, wherein each first optical element is configured to produce a respective illumination spot that substantially overlaps with another respective illumination spot produced by any of the second optical elements when the illumination spot and the other respective illumination spot are projected on a far-field target plane.

Examples of different flash devices will be described more fully hereinafter with reference to the accompanying drawings. These examples are not mutually exclusive, and features found in one example can be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that these terms are intended to encompass different orientations of the element in addition to any orientation depicted in the figures.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

FIG. 1A is a diagram of a photographic system 100, according to aspect of the disclosure. The system 100 may include a flash device 110, an imaging device 120, and control circuitry 130 for operating the flash device 110 and the imaging device 120. The flash device 110 may include a light source 112, a Fresnel Lens 114 disposed upstream from the light source, and a lens array 116 disposed upstream from the Fresnel lens. The flash device is discussed further below with respect to FIGS. 2-11B. The imaging device 120 may include an imaging sensor 122 and a photographic lens 124. The imaging sensor 122 may include any suitable type of imaging sensor, such as a charge-coupled device (CCD) sensor or a complementary metal-oxide-semiconductor (CMOS) sensor. The photographic lens 124 may include any suitable type of lens configured to project an image of a scene onto the imaging sensor.

The control circuitry 130 may be operatively coupled to the imaging device 120 and the flash device 110. The control circuitry 130 may be operable to trigger the flash device, while sampling the imaging device 120 to obtain a digital image of a scene that is illuminated as a result of triggering the flash device 110. The control circuitry 130 may a general purpose processor (e.g., an ARM-based processor), an Application-Specific Integrated Circuit (ASIC), a Field-Programmable Gate Array (FPGA), and or any other suitable type of digital and/or analog circuitry. Although not shown, the control circuitry 130 may include one or more memory devices (e.g., a solid-state memory, a flash memory, EEPROM, etc.).

Figure 1B:
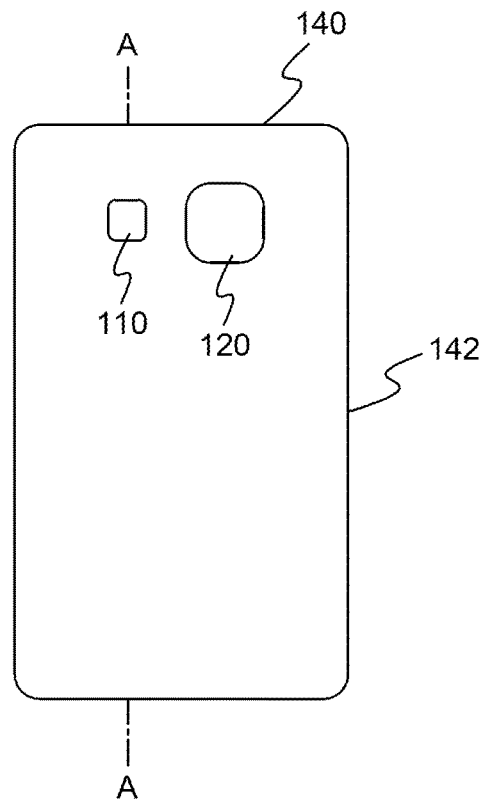
FIG. 1B is a schematic top-down view of an example of an electronic device incorporating the photographic system of FIG. 1A, according to aspects of the disclosure.
Figure 1C:
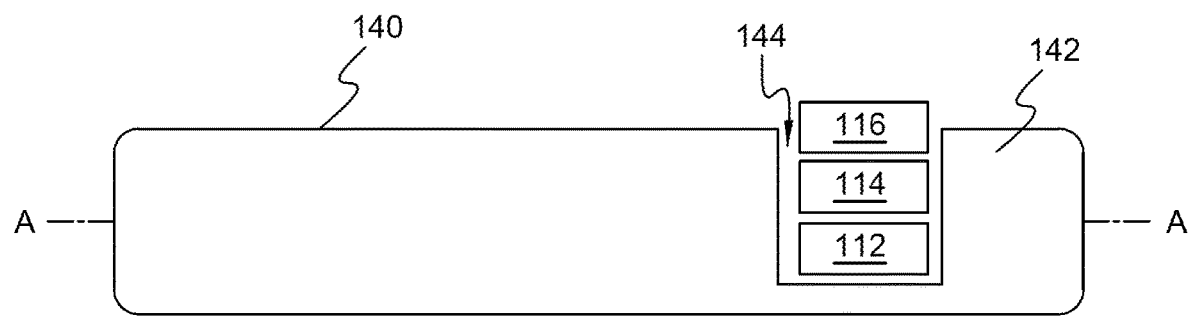
FIG. 1C is a schematic cross-sectional side view of the electronic device of FIG. 1B, according to aspects of the disclosure.

FIG. 1B is a planar view of an example of an electronic device 140 which incorporates the photographic system 100, according to aspects of the disclosure. FIG. 1C is a cross-sectional side view of the electronic device along an axis A-A, according to aspects of the disclosure. As illustrated, the electronic device 140 may include an enclosure 142. Disposed inside the enclosure 142 may be the flash device 110, the imaging 120, and the control circuitry 130. More particularly, the light source 112, the Fresnel lens 114, and the lens array 116 may be disposed in a recess 144 that is formed in the enclosure 142, as shown.

In the present example, the electronic device 140 is a smartphone. However, alternative implementations are possible in which the device 140 is any other suitable type of electronic device, such as a digital single-lens reflex (DSLR) camera, a point-and shoot camera, or a handheld navigation device, for example. Although not shown, the electronic device 140 may include a processor (e.g., an ARM-based processor, a special-purpose process, a FPGA, an ASIC, etc.), a memory (e.g., a random-access memory, a solid-state drive, a flash memory, an EEPROM memory, etc.), a display, an input device (e.g., a touch pad, a key pad, etc.), and/or any other suitable type of component.

Figure 2:
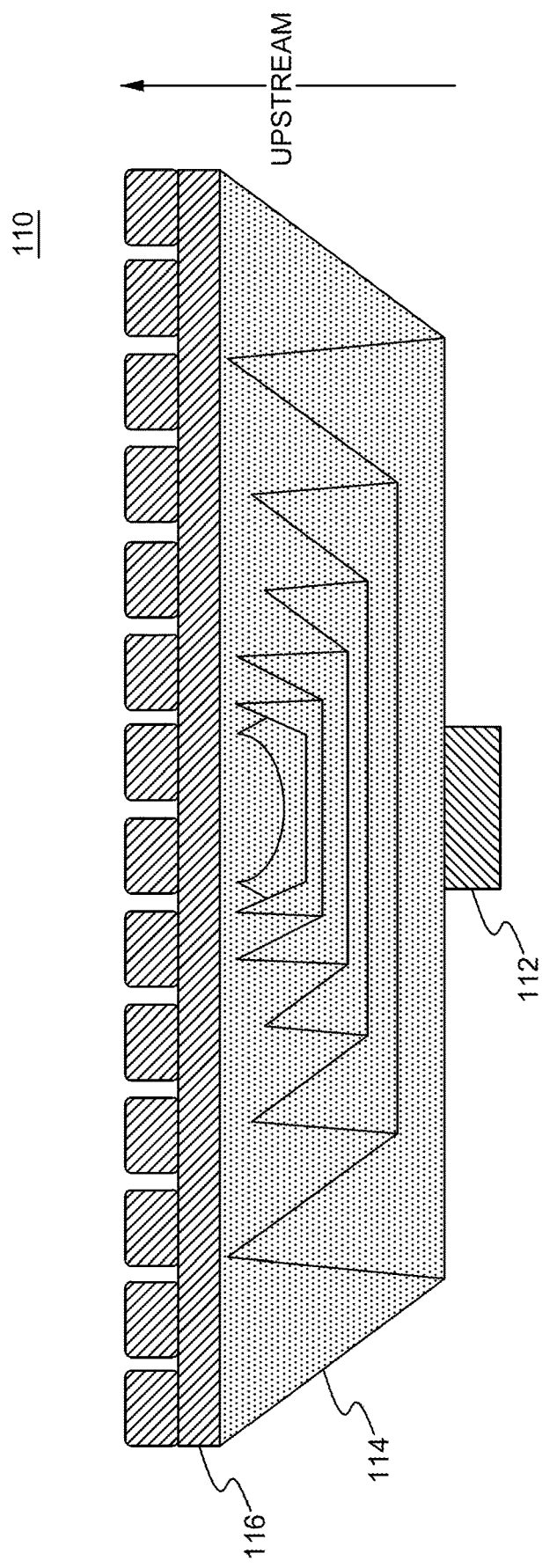
FIG. 2 is a schematic diagram of an example of a flash device, according to aspects of the disclosure.

FIG. 2 is a schematic cross-sectional view of an example of the flash device 110, according to aspects of the disclosure. As illustrated, the flash device 110 may include the light source 112, the Fresnel lens 114, and the lens array 116. The Fresnel lens 114 may be disposed upstream from the light source 112, and the lens array 116 may be disposed upstream from the Fresnel lens 114. When the flash device 110 is activated, light emitted from the light source 112 is propagated, in the upstream direction, through the Fresnel lens 114 and the lens array 116 to illuminate a subject that is being photographed.

The light source 112 may include one or more LEDs. More particularly, in some implementations, the light source 112 may include a first LED and a second LED. The first LED may be configured to output light having a first color temperature. And the second LED may be configured to output light having a second color temperature that is cooler than the first color temperature. As is discussed further below, the light from the first LED and the second LED may be mixed by the lens array 116 to produce light emissions having a selected color temperature, such as white for example.

The Fresnel lens 114 may be optically coupled to the light source 112 to collimate light that is output by the light source 112 and control the field-of-view (FOV) of the flash device 110. In some implementations, the Fresnel lens 114 may be operable to impart a 40-degree FOV on the flash device 110. Additionally or alternatively, in some implementations, the Fresnel lens 114 may be operable to impart a 75-degree field of view on the flash device 110.

Figure 3A:
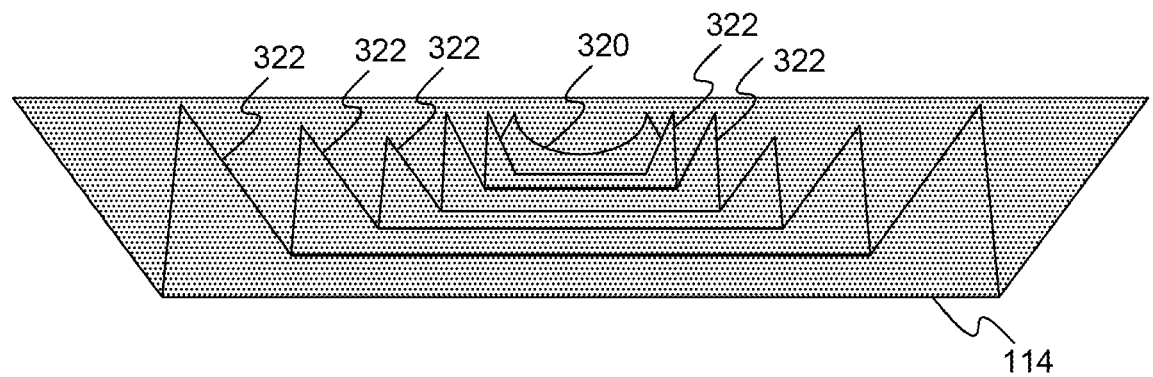
FIG. 3A is a schematic side view of an example of a Fresnel lens that is part of the flash device of FIG. 2, according to aspects of the disclosure.
Figure 3B:
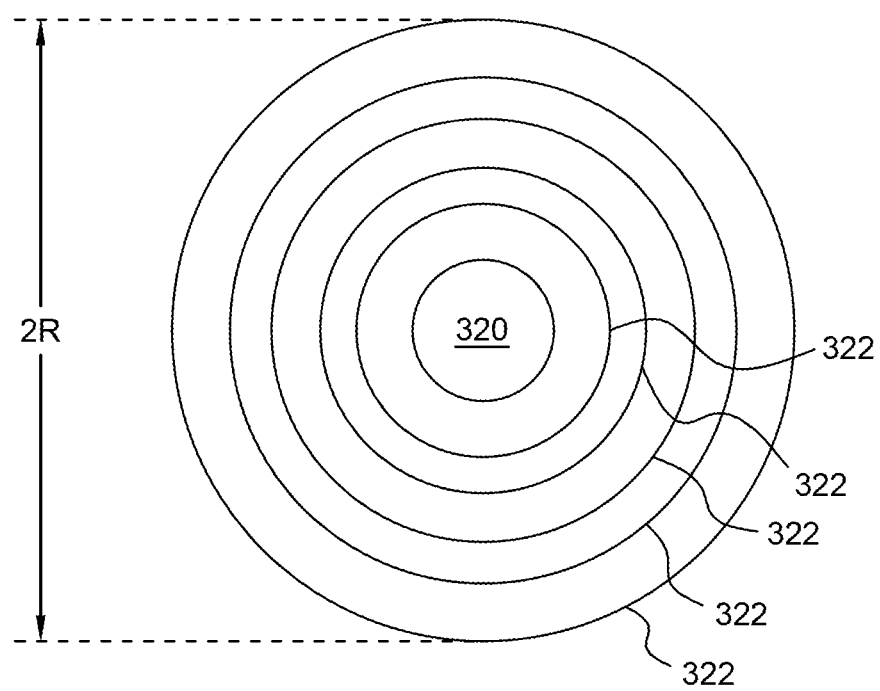
FIG. 3B is a schematic top-down view of the Fresnel lens of FIG. 3A, according to aspects of the disclosure.

FIG. 3A shows cross-sectional side view of the Fresnel lens 114, and FIG. 3B shows a top-down view of the Fresnel lens 114. As illustrated, the Fresnel lens has a circular shape with a radius R. The Fresnel lens 114 includes a plurality of concentric annular sections 322 centered around a convex section 320. Although in the present example the Fresnel lens 114 includes five annular sections 322, alternative implementations are possible in which the Fresnel lens 114 includes any number of annular sections 322 (e.g., 10, 50, 100, etc.) The pitch between adjacent annular sections may be the same or not. The Fresnel lens 114 may be formed of glass, plastic, and/or any other suitable type of material. The size of the Fresnel lens 114 may vary in accordance with design specifications. By way of example, in some implementations, the size of the Fresnel Lens 114 may be in the range of 2 mm-100 mm in diameter.

The lens array 116 may be optically coupled to the Fresnel lens 114 to further condition light that is output from the Fresnel lens 114. The lens array 116 may fulfil at least one of several functions. For example, the lens array 116 may mix light that is output by the light source 112 to achieve high color uniformity. As another example, the lens array 116 may cause the illumination spot produced by the flash device 110 to have a rectangular shape that matches the shape of the imaging sensor 122. As yet another example, the lens array 116 may improve the illuminance distribution of the flash device 110.

Figure 4A:
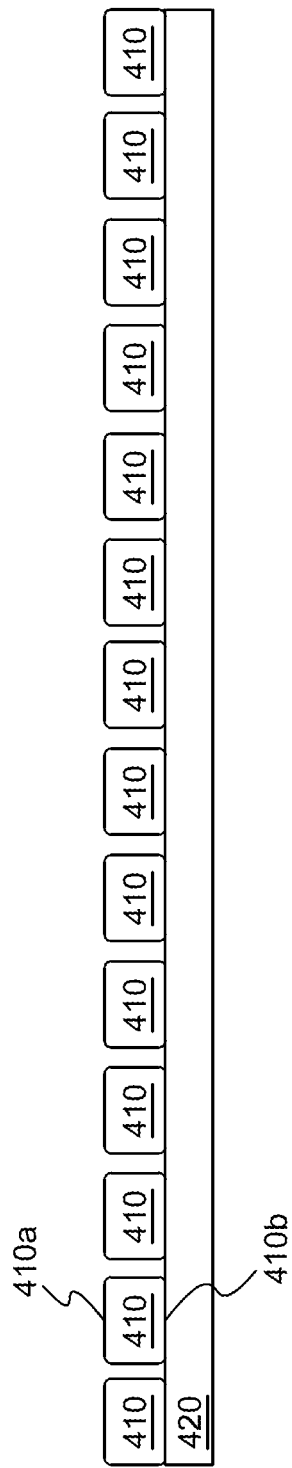
FIG. 4A is a schematic side view of an example of a lens array that is part of the flash device of FIG. 2, according to aspects of the disclosure.
Figure 4B:
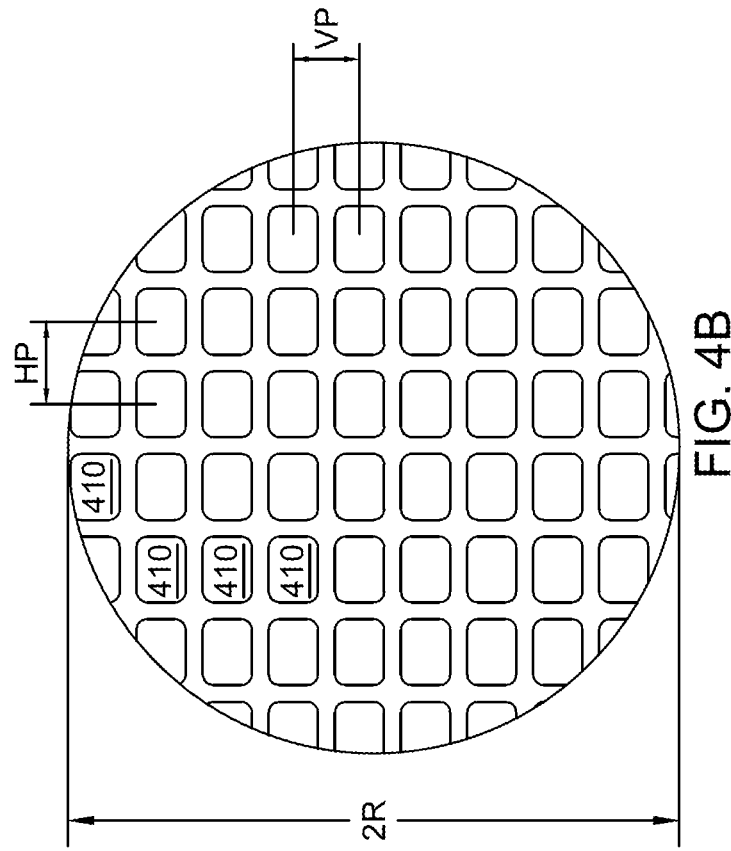
FIG. 4B is a schematic top-down view of the lens array of FIG. 4A, according to aspects of the disclosure.

FIG. 4A is a schematic cross-sectional side view of the lens array 116 and FIG. 4B is a schematic top-down view of the lens array 116. As illustrated, the lens array 116 may include a plurality of optical elements 410 disposed on a substrate 420. The substrate 420 may have a circular shape, with a radius R. Each of the optical elements 410 may include a top surface 410a that faces away from the substrate 420 (and the Fresnel Lens 114) and a bottom surface 410b that faces towards the substrate 420 (and the Fresnel Lens 114). In this regard, the top surface 410a may be referred to as a light-emitting surface and the bottom surface 410b may be referred to as a light-receiving surface.

In some implementations, the lens array 116 may be a micro lens array and each of the optical elements 410 may be a different micro lens. Any of the optical elements 410 and/or the substrate 420 may be formed of glass, plastic, and/or any other suitable type of material. The optical elements 410 may be integral with the substrate 420 or separate from it. Furthermore, although in the present example each of the optical elements 410 has a substantially rectangular cross-section, alternative implementations are possible in which any of the optical elements 410 has a circular or oval cross-section. In this regard, the present disclosure is not limited to any particular geometric shape of the optical elements 410 and/or the substrate 420.

Moreover, the optical elements 410 may be arranged in any suitable pattern on the substrate 420. In the present example, the optical elements 410 are arranged in straight lines on the substrate 420. However, alternative implementations are possible in which the optical elements 410 are arranged in circles and/or in any other suitable pattern. In this regard, the present disclosure is not limited to any particular arrangement of the optical elements 410 on the substrate 420.

In the example of FIGS. 4A-B, the optical elements 410 are identical to one another. However, alternative implementations are possible in which at least two or more of the optical elements 410 are different. For example, the two optical elements may have different widths. Additionally or alternatively, as another example, the two optical elements may have different lengths. Additionally or alternatively, the two optical elements may have different thicknesses. Additionally or alternatively, the two optical elements may have different horizontal curvatures. Additionally or alternatively the two optical elements may have different vertical curvatures.

In the example of FIGS. 4A-B, the optical elements are spaced apart. However, alternative implementations are possible in which the optical elements are directly abutting each other.

In the example of FIGS. 4A-B, the vertical pitch VP between the optical elements is the same throughout the entire lens array 116. However, alternative implementations are possible in which the vertical pitch VP varies. In such instances, the vertical pitch VP of a first pair of neighboring optical elements 410 in the lens array 116 may be different from the vertical pitch VP of a second pair of neighboring optical elements 410 in the lens array 116. According to aspects of the disclosure, the vertical pitch VP of a pair of optical elements 410 includes the horizontal distance between the center C of a first optical element 410 in the pair and the center C of a second optical element in the pair. Furthermore, according to aspects of the disclosure, two optical elements 410 are considered neighboring if there are no other elements between them (i.e., if there are directly adjacent to one another, etc.).

In the example of FIGS. 4A-B, the horizontal pitch HP between the optical elements is the same throughout the entire lens array 116. However, alternative implementations are possible in which the horizontal pitch varies. In such instances, the horizontal pitch HP of a first pair of neighboring optical elements 410 in the lens array 116 may be different from the horizontal pitch HP of a second pair of neighboring optical elements 410 in the lens array 116. According to aspects of the disclosure, the horizontal pitch of a pair of optical elements 410 includes the vertical distance between the center C of a first optical element 410 in the pair and the center C of a second optical element in the pair.

In the example of FIGS. 4A-B, each of the optical elements 410 may be configured to output a beam of light having a focal point F. (e.g., see FIG. 6.) In such instances, each of the optical elements 410 may be characterized by a central axis C which describes the direction in which the beam is emitted from that optical element. (e.g., see FIGS. 5B and 5D.) More particularly, in the present example, the central axis of a given optical element 410 may be one that starts at the center of the top surface 410a of the optical element 410 and passes through the focal point F of the optical element 410. Additionally or alternatively, in some implementations, the central axis of a given optical element 410 may be one that starts at the center of the top surface 410a of the optical element 410 and extends perpendicularly to the top surface 410a of the optical element.

In the example of FIGS. 4A-B, the optical elements 410 in the lens array 116 are configured to have parallel optical axes, such that the central axis of each optical element 410 is parallel to the optical axis any other optical element 410 in the lens array 116. However, in some implementations, the optical axes of at least two optical elements in the lens array 116 may be arranged to diverge. Additionally or alternatively, in some implementations, the optical axes of at least two optical elements may be arranged to meet in a particular target plane.

Figure 5A:
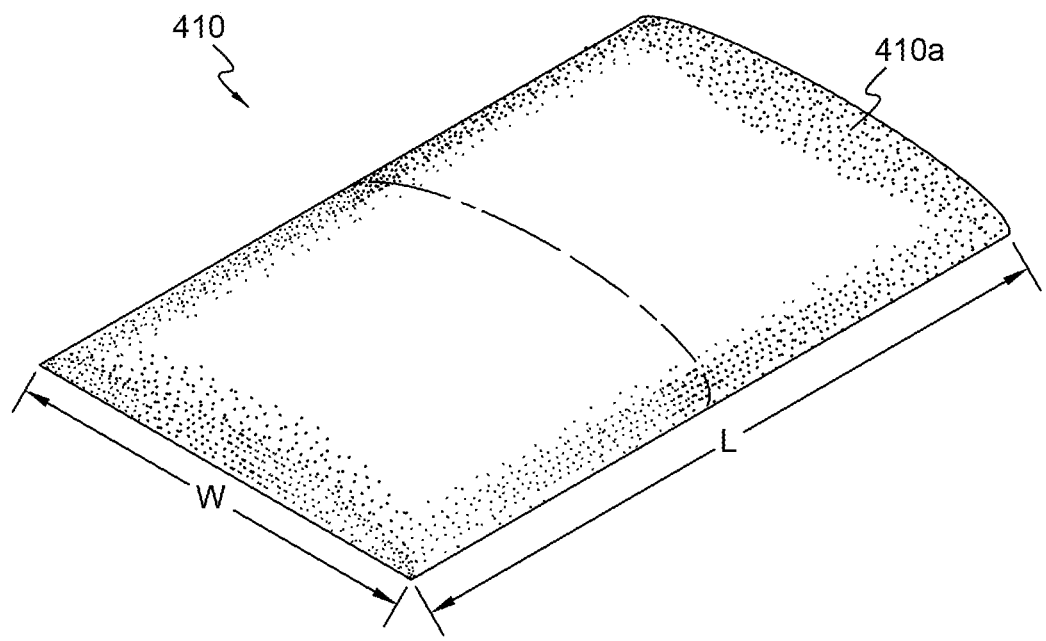
FIG. 5A is a schematic perspective view of an example of an optical element that is part of the lens array of FIG. 4A, according to aspects of the disclosure.
Figure 5B:
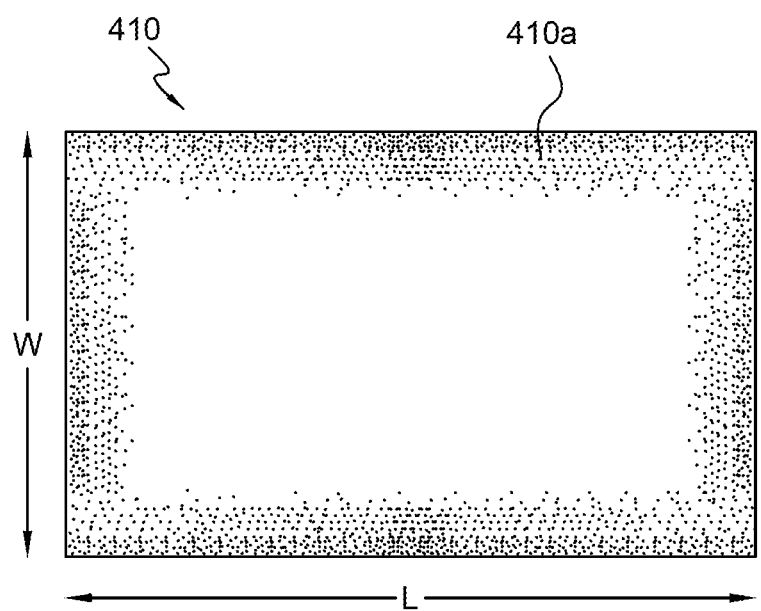
FIG. 5B is a schematic planar view of the optical element of FIG. 4A when viewed from the top, according to aspects of the disclosure.
Figure 5C:
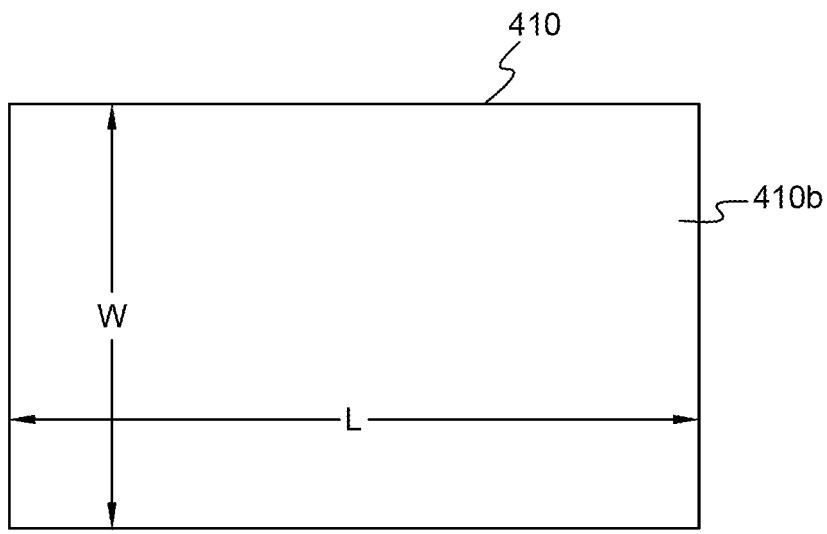
FIG. 5C is a schematic planar view of the optical element of FIG. 5A when viewed from the bottom, according to aspects of the disclosure.

FIG. 5A is a perspective view of an example of an optical element 410 and FIG. 5B is a planar view of the optical element 410 when viewed from the top. As illustrated, the optical element 410 may have a curved top surface 410a. FIG. 5C is a planar view of the optical element 410 when viewed from the bottom. As illustrated, the bottom surface 410b of the optical element 410 may be rectangular in shape, and it may have a width W and a length L. Although in the present example, the bottom surface 410b of the optical element 410 has a rectangular shape, alternative implementations are possible in which the bottom surface 410b has a circular shape, and/or any other suitable type of shape.

Figures 5D, 5E:
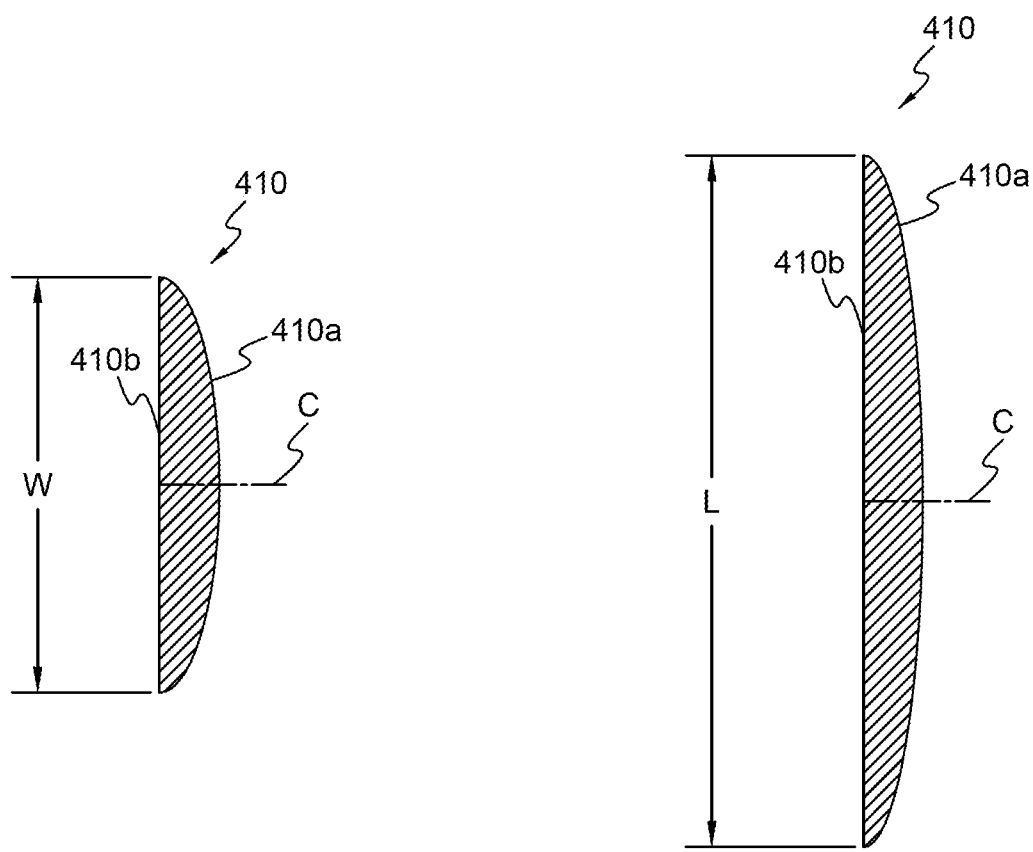
FIG. 5D is a schematic cross-sectional view of the optical element of FIG. 5A, taken along the optical element's width, according to aspects of the disclosure.
FIG. 5E is a schematic cross-sectional view of the optical element of FIG. 5A, taken along the optical element's length, according to aspects of the disclosure.

FIG. 5D is cross-sectional side view of the optical element 410 taken along the width W of the optical element 410. FIG. 5E is a cross-sectional view of the optical element 410 taken along the length L of the optical element 410. As illustrated, the top surface 410a of the optical element 410 may have a first curvature along the width W of the optical element 410 and a second curvature along the length L of the optical element 410. In some implementations, the first curvature may be the same as the second curvature. Additionally or alternatively, in some implementations, the first curvature may be different from the second curvature.

According to aspects of the disclosure, the optical element 410 may have an aspect ratio. The aspect ratio of the optical element may be one of: (i) the ratio between the width W and the length L or (ii) the ratio between the length L and the width W. In some implementations, the aspect ratio may match the aspect ratio of the imaging sensor 122. For example, the aspect ratio of the optical element 410 may be equal to the aspect ratio of the imaging sensor 122. As another example, the aspect ratio of the optical element 410 may substantially equal the aspect ratio of the imaging sensor 122, such that the two ratios are within 10%-15% from one another.

According to aspects of the disclosure, the optical element 410 may have a curvature ratio. The curvature ratio of the optical element 410 may be one of (i) the ratio between the curvature of the top surface 410a along the length of the optical element 410 and the curvature of the top surface 410a along the width of the optical element 410(b) and the ratio between the curvature of the top surface 410a along the width of the optical element 410 and the curvature of the top surface 410a along the length of the optical element 410(b). In some aspects, the curvature ratio of the optical element 410 may match the aspect ratio of the imaging sensor 122. For example, the curvature ratio of the optical element 410 may match the aspect ratio of the imaging sensor 122 if the two ratios are equal or substantially equal (e.g., within 10%-15% from one another). As another example, the curvature ratio of the optical element 410 may match the aspect ratio of the imaging sensor 122, if it causes an illumination spot produced by the optical element to have an aspect ratio that is equal or substantially equal to the aspect ratio of the imaging sensor 122.

Figure 6:
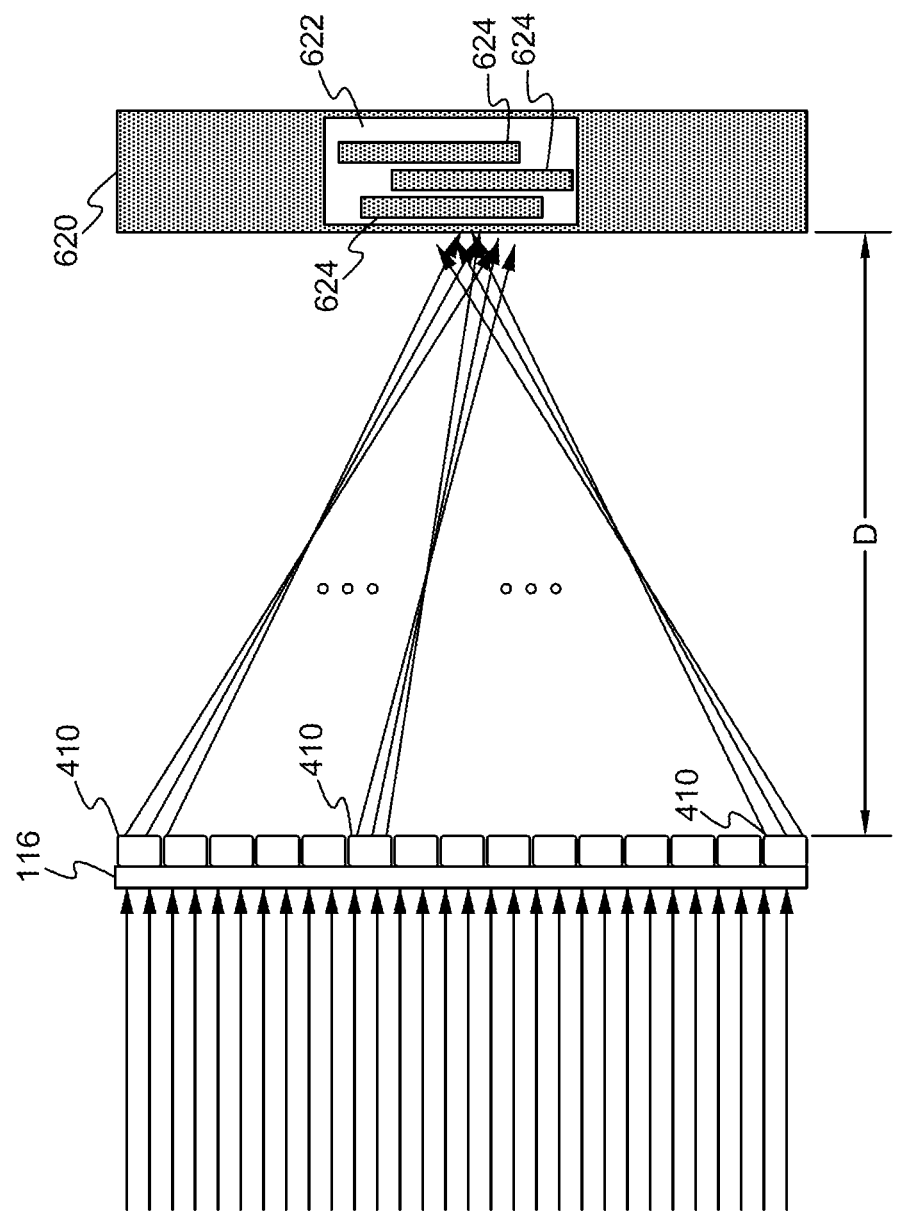
FIG. 6 is a schematic diagram illustrating the operation of the flash device of FIG. 2, according to aspects of the disclosure.

FIG. 6 is a diagram illustrating the operation of the lens array 116, according to aspects of the disclosure. When the flash device 110 is activated, each of the optical elements 410 may receive collimated light from the Fresnel lens 114, which is then refracted and emitted in the upstream direction. As a result, the flash device 110 may project an illumination spot 622 onto a target plane 620. As discussed above, the illumination spot 622 of the flash device 110 may include the illumination spots 624 produced by different ones of the optical elements 410. As is further discussed below with respect to FIG. 7, each of the illumination spots 622 may overlap with at least one other illumination spot 622.

The target plane 620 may be a plane that is located at a distance D from the lens array 116. In some implementations, the distance D may be equal at least ten times the diameter of the lens array 116 (e.g., 10×2R) and any illumination that is performed on the target plane 620 may be referred to as "far-field illumination". According to aspects of the disclosure, the lens array 116 may be designed with a specific application in mind. For instance, if the flash device 110 is intended to be used in close-range photography, the lens array 116 may be designed to project a certain illumination pattern onto a target plane that is located approximately 1 meter away from the lens array 116.

In some implementations, the central axes of the optical elements 410 may be parallel to one another, while the illumination spots 624 produced by the optical elements 410 substantially overlap. As can be readily appreciated, the substantial overlap between the illumination spots 624 may be made possible due to the pitch (e.g., horizontal pitch HP and/or vertical pitch VP) of the optical elements 410 being negligible in comparison to the size of the illumination spot 622 produced by the flash device 110.

In some implementations, any of the illumination spots 624 produced by the individual optical elements 410 may have a rectangular shape. This shape can be achieved by optimizing the respective vertical and horizontal curvatures of each optical element 410. Causing the illumination spots 624 to have a rectangular shape may in turn result in the illumination spot 622 also having a rectangular shape, which is preferable because the imaging sensor 122 of the imaging device 120 is also rectangular.

In some implementations, the illumination spot 622 may at least partially match the shape of the field-of-view (FOV) of the imaging device 120. For example, the illumination spot 622 may have a width that is substantially equal to the width of FOV of the imaging device 120. Additionally or alternatively, the illumination spot 622 may have a length that is substantially equal to the length of the FOV of the imaging device 120.

Arranging the illumination spot 622 to have the same and/or similar size to the FOV of the imaging device 120 may result in higher illumination uniformity the better photo quality. Besides, if the size and shape of illumination spot 622 is substantially the same as the FOV of the imaging device 120, then the effective optical efficiency could be very high. As discussed above, the shape and illumination uniformity of the illumination spot 622 can be optimized by varying the horizontal and vertical curvatures of the optical elements 410.

Figure 7:
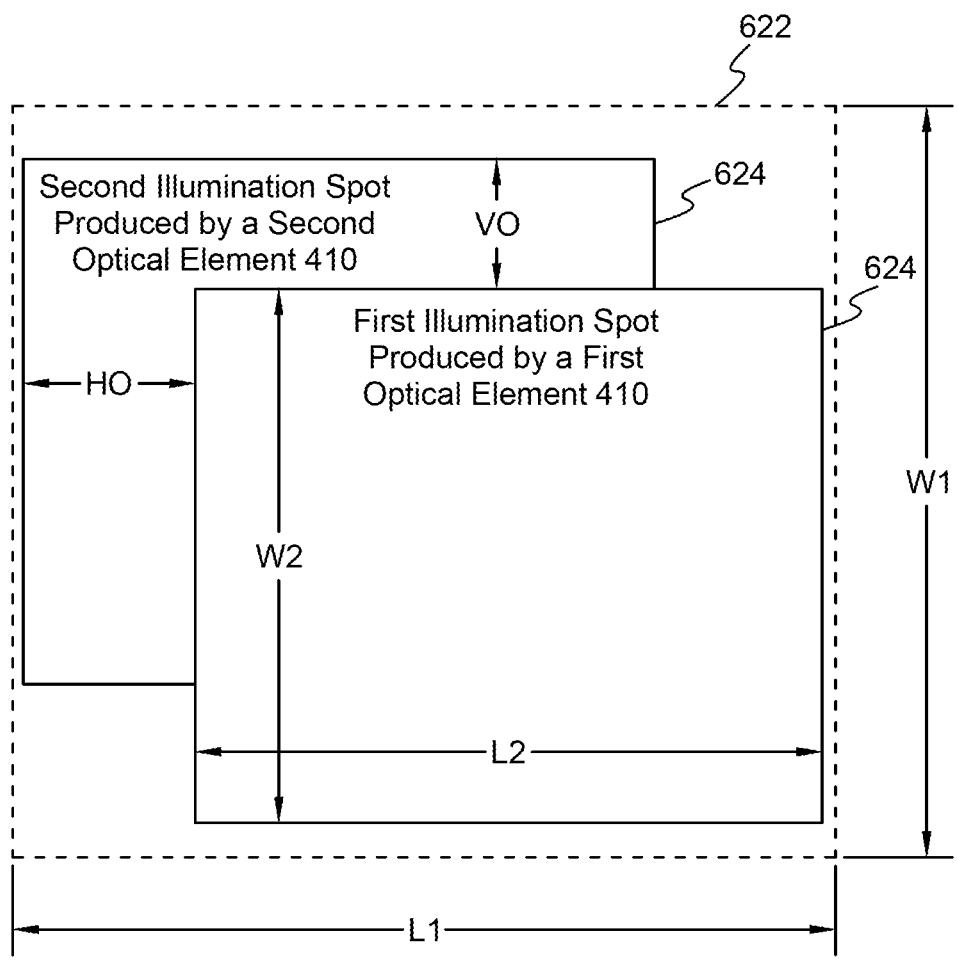
FIG. 7 is a schematic diagram illustrating the operation of the flash device of FIG. 2, according to aspects of the disclosure.

FIG. 7 is a schematic diagram of the illumination spot 622 discussed with respect to FIG. 6. As noted above, the illumination spot 622 represents at least some of the pattern of light emitted by flash device 110 and it is the aggregation of illumination spots 624 that are produced by individual optical elements 410 in the lens array 116. In the present example, the illumination spot 622 has a length L1 and width W2 when projected onto the target plane 620. As noted above, the length L1 may substantially equal the length of the FOV of the imaging device 120 and/or the width W1 may substantially equal the width of the FOV of the imaging device 120.

In the example of FIG. 7, the illumination spot 622 includes a first illumination spot 624 that is produced by a first optical element 410 and a second illumination spot 624 that is produced by a second optical element 410. The first illumination spot has a length L2 and a width W2. In some implementations, the ratio of the width W2 to the length L2 of a given illumination spot may substantially equal the aspect ratio of the imaging sensor 122. Additionally or alternatively, in some implementations, the ratio of the length L2 to the width W2 of a given illumination spot may substantially equal the aspect ratio of the imaging sensor 122.

As noted above, the first illumination spot 624 and the second illumination spot 624 may substantially overlap when projected on the target plane 620. By way of example, in some implementations, the illumination spots may substantially overlap when the vertical offset VO between them is no greater than 15% of the width of any of the first and second illumination spots. Additionally or alternatively, in some implementations, the illumination spots 624 may substantially overlap when the horizontal offset HO between them is no greater than 15% of the length of any of the first and second illumination spots.

As noted above, the illumination spot 622 is the aggregation of the illumination spots produced by individual optical elements 410. Although only two illumination spots 624 are shown in FIG. 7, it will be understood that the illumination spot 622 may include as many illumination spots 624 as there are optical elements 410 in the lens array 116. Furthermore, although in the example discussed with respect to FIGS. 2-7 all illumination spots 624 overlap with one another, alternative implementations are possible in which at least two illumination spots 624 do not overlap.

Figure 8:
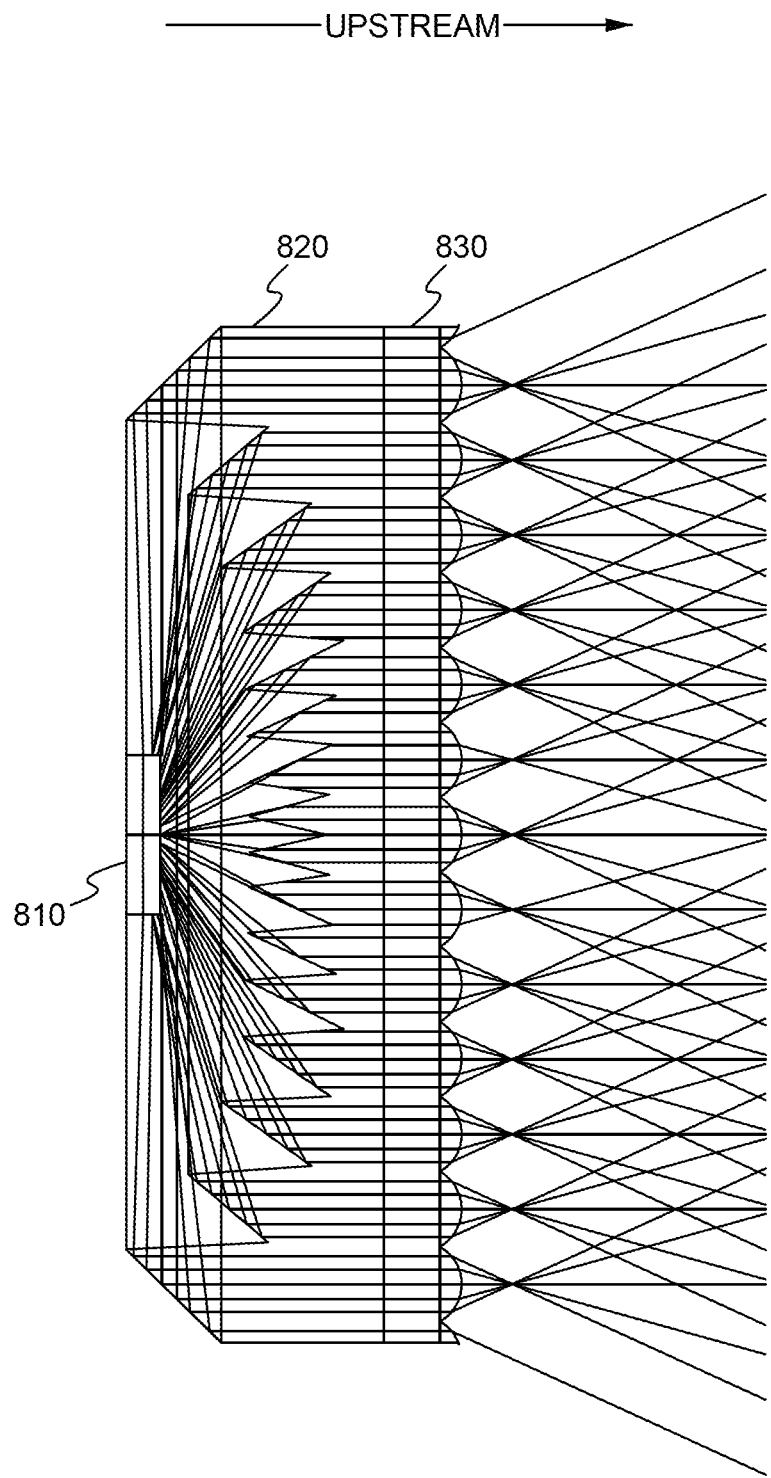
FIG. 8 is a schematic diagram illustrating the operation of the flash device of FIG. 2, according to aspects of the disclosure.

FIG. 8 is a diagram of an example of a flash device 800, according to aspects of the disclosure. The flash device 800 includes a light source 810, a Fresnel lens 820 disposed upstream from the light source 810, and a lens array 830 disposed upstream from the Fresnel lens 820. In some implementations, the light source 810 may be the same or similar to the light source 112. In some implementations, the Fresnel lens 820 may be the same or similar to the Fresnel lens 114. Additionally or alternatively, in some implementations, the lens array 830 may be the same or similar to the lens array 116. In operation, the light source 810 emits light which is then collimated by the Fresnel lens 820. The collimated light is subsequently coupled into the lens array 830 to be emitted in a desired direction.

Figure 9:
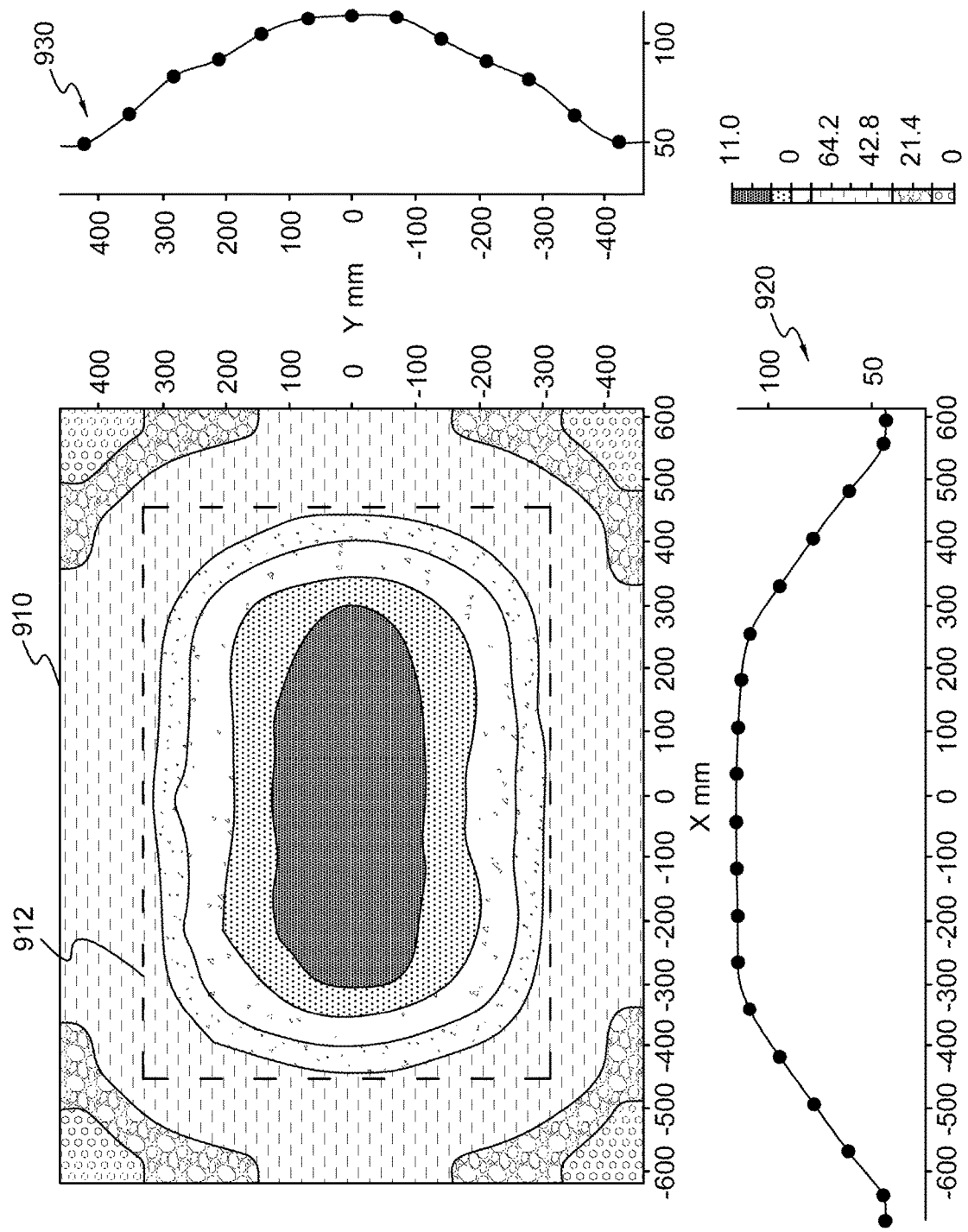
FIG. 9 is an illuminance distribution raster chart of the flash device of FIG. 2, in accordance with a first configuration.

FIG. 9 illustrates the performance a first example of the flash device 800, in accordance with a first configuration. In accordance with the first configuration, the light source 810 includes a single LED having a flux of 250 lm at 1 A of power, at 1 meter of distance, and it has dimensions of 1.4 mm×1.4 mm. The Fresnel lens 820 has a 75-degree FOV and a 9 mm diameter, while including 8 annular sections. The lens array 830 includes 13 optical components arranged in straight lines, as shown in FIG. 4B. The diameter of the lens array 830 is 9 mm, while the respective dimensions of the bottom surface of each optical element are 0.67 mm*0.5 mm. The horizontal curvature of each optical element is 2.6, and the vertical curvature of each optical element is 2.6. In accordance with the first configuration, the optical elements in the lens array 830 are directly abutting each other. Various operational parameters the flash device 800, when in the first configuration, are shown in Table 1, below, as well as plots 910, 920, and 930. Plot 910 is an illumination raster chart showing the illuminance distribution pattern produced by the flash device 800 on a target plane situated one meter away from the flash device 800. Plot 920 shows the illuminance distribution along the X-axis of the plot 910. And plot 930 shows the illuminance distribution along the Y-axis of the plot 910.

Notably, Table 1 below includes columns titled FOV75 and 0.7FOV, respectively. The column titled FOV75 relates to the entire 75-degree FOV of the lens 820, and it is associated with a target surface size of 1228 mm by 921 mm. The operational parameters in this column measure the performance of the lens 820 across the entire 75-degree FOV. The column titled 0.7FOV relates to the performance of the lens 820 in the inner 75% of the 75-degree FOV, and it is associated with a target surface size of 921 mm by 691 mm. The operational parameters in this column measure the performance of the lens 820 across the inner 75% of the 75-degree FOV, and they do not account for the performance of the lens 820 on the fringes of the 75-degree FOV. As illustrated in Table 1, the first configuration of the optical system 800 has a high optical efficiency with an on-axis gain of 1.4 at 75-degree FOV. Furthermore, the first configuration of optical system 800 has a high vertical and horizontal uniformity.

TABLE 1

Operational Parameters of the Flash Device 800 When in the First Configuration

| lens design | FOV75 | 0.7FOV | units |
|---|---|---|---|
| central illuminance | 117 | | lux (LED flux = 250 lm@ 1A) @1 m |
| On-axis illumination | 0.47 | | Lux/lm |
| On-axis gain | 1.4 | | — |
| diagonal uniformity | 20 | 53 | % |
| horizontal uniformity | 37 | 72 | % |
| vertical uniformity | 40 | 68 | % |

In some implementations, only the portion 912 of the illuminance distribution pattern produced by the flash device 800 may correspond to the flash device's 800 illumination spot. In such instances, the remainder of the illuminance distribution may fall outside of the FOV of a camera the flash device 800 is paired with. As illustrated, portion 912 has a substantially rectangular shape and exhibits high brightness uniformity.

Figure 10:
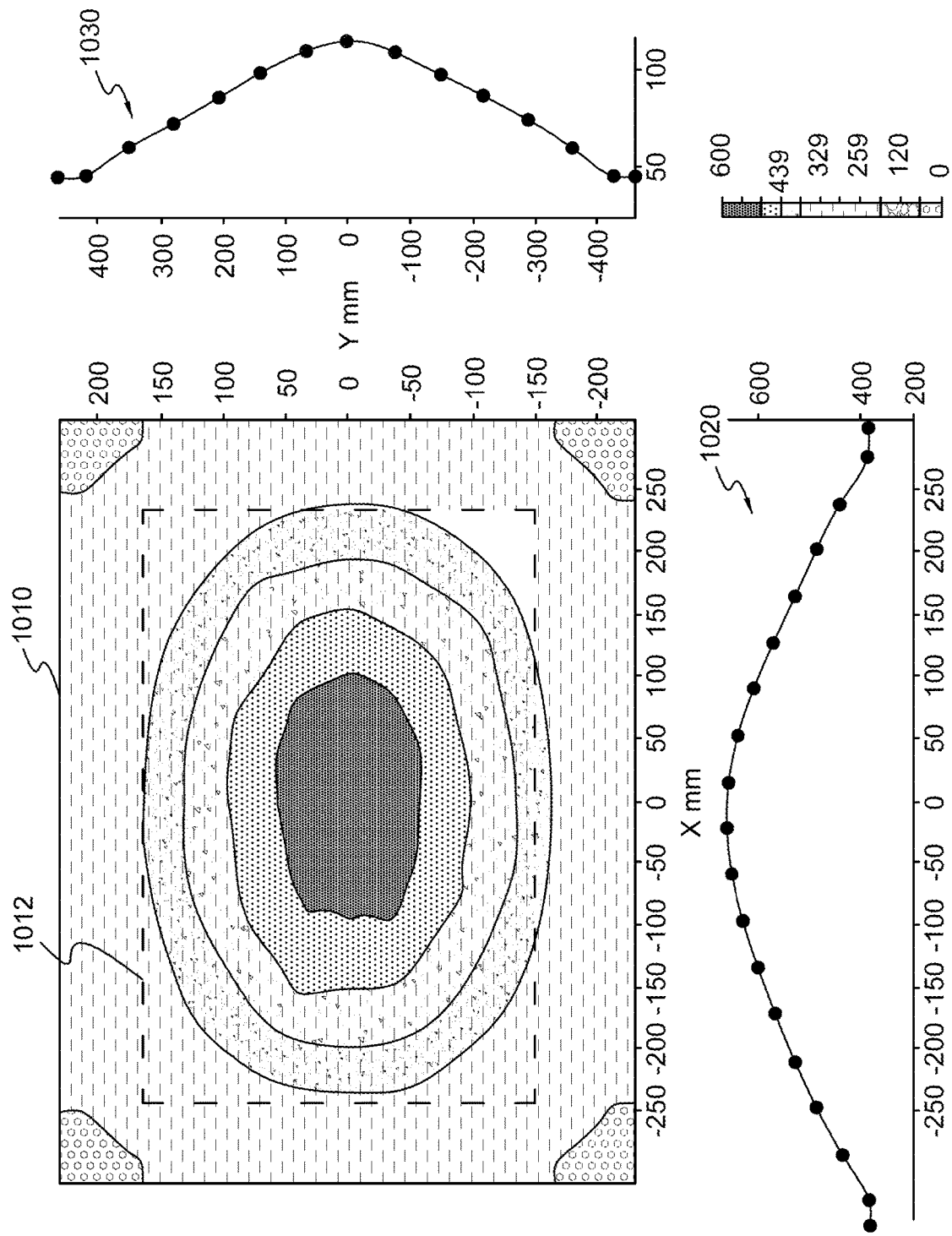
FIG. 10 is an illuminance distribution raster chart of the flash device of FIG. 2, in accordance with a second configuration.

FIG. 10 illustrates the performance of a second example of the flash device 800, in accordance with a second configuration. In accordance with the second configuration, the light source 810 includes a single LED having a flux of 250 lm at 1 A of power, at 1 meter of distance, and it has dimensions of 1.4 mm×1.4 mm. The Fresnel lens 820 has a 40-degree FOV and diameter of 9 mm, while including 8 annular sections. The lens array 830 includes 13 optical components arranged in straight lines, as shown in FIG. 4B. The diameter of the lens array 830 is 9 mm, while the respective dimensions of the bottom surface of each optical element are 0.67 mm×0.5 mm. The horizontal curvature of each optical element is 2.6, and the vertical curvature of each optical element is 2.6. In accordance with the second configuration, the optical elements in the lens array 830 are directly abutting each other.

Various operational parameters of the flash device 800, when in the second configuration, are shown in Table 2, below, as well as plots 1010, 1020, and 1030. Plot 1010 is an illumination raster chart showing the illuminance distribution pattern produced by the second configuration of the flash device 800 on a target plane situated one meter away from the flash device 800. Plot 1020 shows the illuminance distribution along the X-axis of the plot 1010. And plot 1030 shows the illuminance distribution along the Y-axis of the plot 1010.

Notably, Table 2 below includes columns titled FOV40 and 0.7FOV, respectively. The column titled FOV40 relates to the entire 40-degree FOV of the lens 820, and it is associated with a target surface size of 582 mm by 437 mm. The operational parameters in this column measure the performance of the lens 820 across the entire 40-degree FOV. The column titled 0.7FOV relates to the performance of the lens 820 in the inner 75% of the 40-degree FOV, and it is associated with a target surface size of 408 mm by 306 mm. The operational parameters in this column measure the performance of the lens 820 across the inner 75% of the 40-degree FOV, and they do not account for the performance of the lens 820 on the fringes of the 40-degree FOV.

As illustrated, the optical system 800 has a high optical efficiency with an on-axis lens gain of up to 7.2 at 40-degree FOV. Furthermore, the first configuration of optical system 800 has a high vertical and horizontal uniformity.

TABLE 2

Operational Parameters of the Flash Device 800 When in the Second Configuration

| lens design | FOV40 | 0.7FOV | units |
|---|---|---|---|
| central illuminance | 603 | | lux (LED flux = 250 lm@ 1A) @1 m |
| On-axis illuminance | 2.4 | | Lux/lm |
| On-axis gain | 7.2 | | — |
| diagonal uniformity | 33 | 53 | % |
| horizontal uniformity | 50 | 71 | % |
| vertical uniformity | 49 | 67 | % |

In some implementations, only the portion 1012 of the illuminance distribution pattern produced by the flash device 800 may correspond to the flash device's 800 illumination spot. As illustrated, this portion has a substantially rectangular shape and exhibits high brightness uniformity.

Figure 11A:
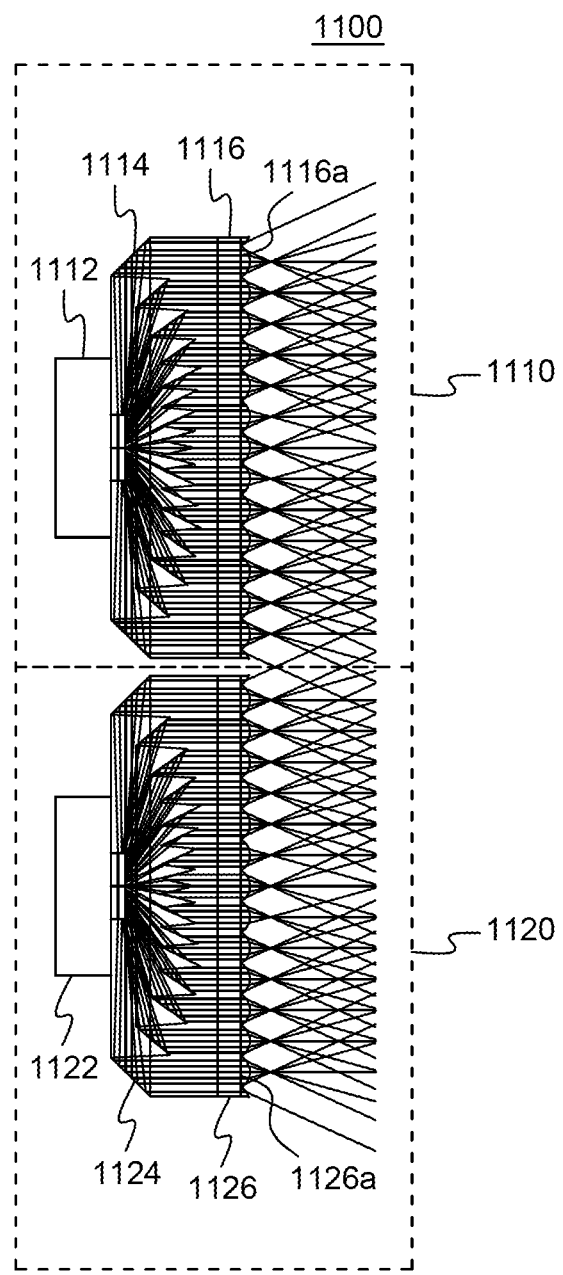
FIG. 11A is a schematic diagram of an example of another flash device, according to aspects of the disclosure.

FIG. 11A is a diagram of an example of a flash device 1100, according to aspects of the disclosure. The flash device 1100 may include a first flash assembly 1110 disposed adjacently to a second flash assembly 1120. Each of the flash assemblies 1110 and 1120 may be the same or similar to the flash device 110 discussed with respect to FIGS. 1A-7.

More particularly, the first flash assembly 1110 may include a light source 1112, a Fresnel lens 1114 disposed upstream from the light source 1112, and a lens array 1116 disposed upstream from the Fresnel lens 1114. The Fresnel lens 1114 may be arranged to collimate light produced by the light source 1112 and couple the collimated light into the lens array 1116. In accordance with the present example, the Fresnel lens 1114 may be the same or similar to the Fresnel lens 114. Furthermore, the lens array 1116 may be the same or similar to the lens array 116.

The second flash assembly 1120 may include a light source 1122, a Fresnel lens 1124 disposed upstream from the light source 1122, and a lens array 1126 disposed upstream from the Fresnel lens 1124. The Fresnel lens 1124 may be arranged to collimate light produced by the light source 1122 and couple the collimated light into the lens array 1126. In accordance with the present example, the Fresnel lens 1114 may be the same or similar to the Fresnel lens 114. Furthermore, the lens array 1116 may be the same or similar to the lens array 116.

According to aspects of the disclosure, the light source 1112 may include one or more first LEDs. According to aspects of the disclosure, the light source 1122 may include one or more second LEDs. Any of the first LEDs may be arranged to produce light having a first color temperature. Any of the second LEDs may be arranged to produce light having a second color temperature. In some implementations, the first color temperature may be cooler than the second color temperature.

Figure 11B:
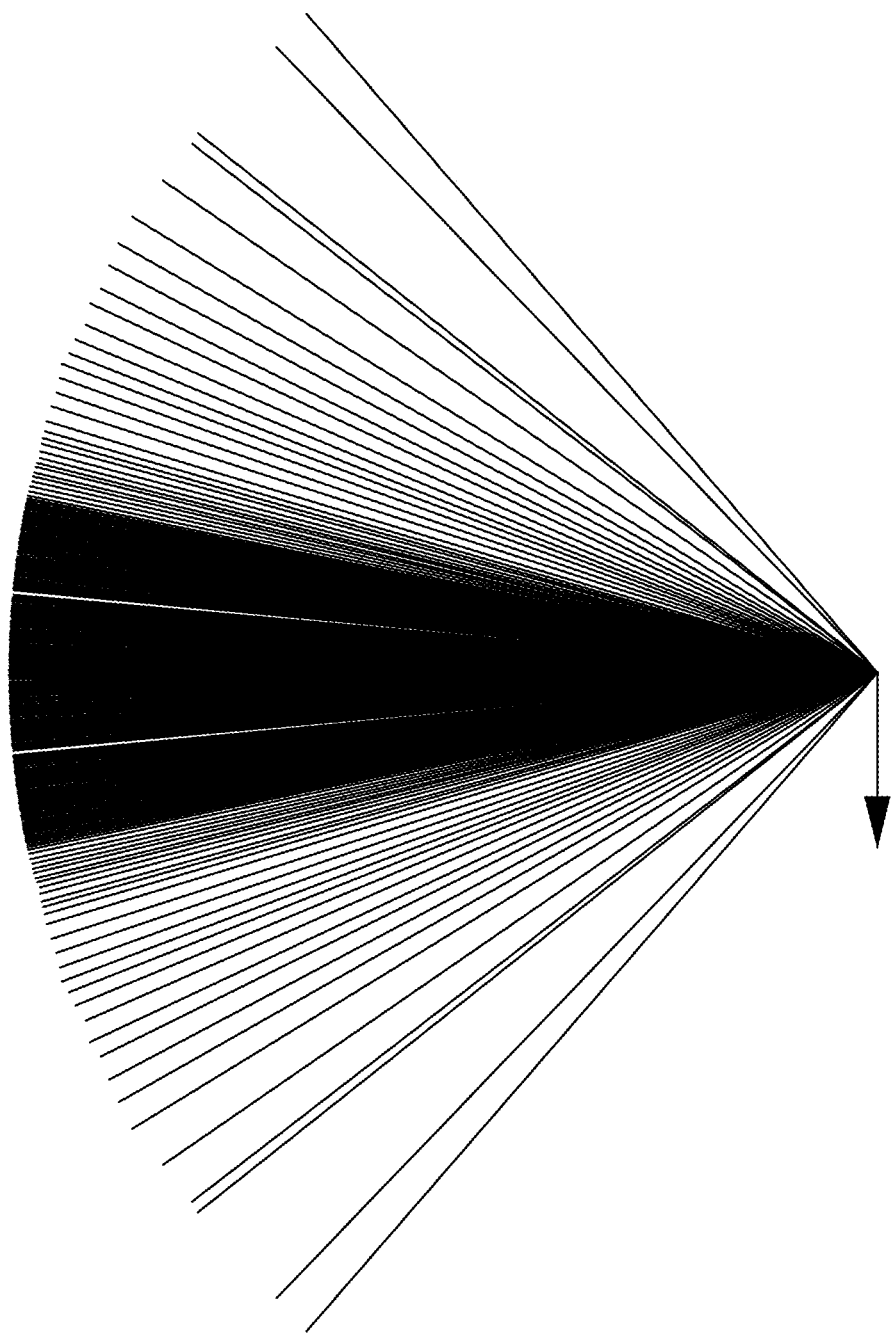
FIG. 11B is a plot illustrating the color-mixing capabilities of the flash device of FIG. 11A, according to aspects of the disclosure.

According to aspects of the disclosure, the lens arrays 1116 and 1126 may be configured to mix the light output from the light source 1112 with the light output from the second light source 1122. In this regard, FIG. 11A illustrates the color mixing of the first flash assembly 1110 and the second flash assembly 1120 in the near-field, while FIG. 11B illustrates the color mixing of the first flash assembly 1110 and the second flash assembly 1120 in the far-field. As illustrated in FIG. 11A, the light output of the first flash assembly 1110 remains separate from the light output of the second flash assembly 1120 in the near-field. However, as illustrated in FIG. 11B, the light outputs of the first flash assembly 1110 and the second flash assembly 1120 become substantially mixed in the far-field. According to the present example, the near-field light mixing may occur at a distance that is less than ten times the diameter of the Fresnel lens 1114 (and/or Fresnel lens 1114), while the far-field light mixing may occur at a distance that is greater than ten times the diameter of the Fresnel lens 1114 (and/or Fresnel lens 1124).

As noted above, each of the lens arrays 1116 and 1126 may be the same or similar to the lens array 116 discussed with respect to FIGS. 1A-7. The lens array 1116 may include a plurality of first optical elements 1116a disposed on a substrate, and the lens array 1126 may include a plurality of second optical elements 1126a disposed on another substrate. Each of the optical elements 1116a and 1126a may be configured in the manner discussed with respect to the optical elements 410. More particularly, each of the first optical elements 1116a may be configured to produce a respective first illumination spot and each of the second optical elements 1126a may be configured to produce a respective second illumination spot. In some implementations, the respective first illumination spot produced by any given first optical element 1116a may substantially overlap with the respective second illumination spot produced by a given second optical element 1126a when the two illumination spots are projected on a given far-field plane, such as the target plane 620. As discussed above, the substantial overlap between the illumination spots may be made possible due to distance between any given first optical element 1116a and any of the second optical elements 1126b being negligible in comparison to the size of the illumination spots they produce.

FIGS. 1A-11B are provided as an example only. In this regard, it should be noted that FIG. 6 is not up to scale, which results in the appearance that the central axes of the optical elements 410 are arranged to meet on the target plane 620. While this is certainly a possibility, in the example discussed with respect to FIG. 6, the central axes of the optical elements 410 are intended to be parallel to one another.

Although some of the concepts disclosed herein are presented in the context of smart phone cameras, it will be understood that the flash device disclosed herein can be used in conjunction with any imaging device. At least some of the elements discussed with respect to these figures can be arranged in different order, combined, and/or altogether omitted. It will be understood that the provision of the examples described herein, as well as clauses phrased as "such as," "e.g.", "including", "in some aspects," "in some implementations," and the like should not be interpreted as limiting the disclosed subject matter to the specific examples. As used throughout the disclosure, the term "adjacent" and its inflected forms may be interpreted as "lying near," "lying directly next to," and/or "lying some distance apart."

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is being claimed is:

1. An apparatus comprising:
   a light source, the light source including a first light emitting diode (LED) having a first color temperature and a second LED having a second color temperature that is warmer than the first color temperature;
   a Fresnel lens configured to collimate light produced by the light source to produce a collimated beam;
   a substrate configured to receive the collimated beam through a first surface of the substrate, the first surface contacting the Fresnel lens, the substrate further configured to direct the collimated beam out of the substrate through a second surface of the substrate, the second surface being opposite the first surface; and
   a lens array configured to mix the collimated beam to produce a diverging light output that has a generally uniform color temperature, the lens array comprising a plurality of optical elements arranged on the substrate, each optical element including a respective planar surface that contacts the second surface of the substrate, each optical element further including a convex surface opposite the respective planar surface.

2. The apparatus of claim 1, the lens array producing light with a third color temperature that is different from the first and second color temperatures.

3. The apparatus of claim 1, wherein each optical element is configured to produce a respective illumination spot that substantially overlaps with another respective illumination spot produced by at least one other optical element when the illumination spot and the other respective illumination spot are projected on a target plane.

4. The apparatus of claim 3, wherein the target plane is located at a distance from the lens array, the distance being at least ten times greater than a dimension of the lens array.

5. The apparatus of claim 1, further comprising an imaging sensor having an imaging sensor aspect ratio, wherein each optical element is configured to produce a respective illumination spot having an aspect ratio that is substantially the same as the imaging sensor aspect ratio.

6. The apparatus of claim 1, wherein the convex surface of any of the optical elements has a first curvature along a first axis and a second curvature along a second axis that is orthogonal to the first axis, the second curvature being different from the first curvature.

7. The apparatus of claim 1, further comprising an imaging sensor having an imaging sensor aspect ratio, wherein the second surface of any of the optical elements has a first curvature along a first axis and a second curvature along a second axis that is orthogonal to the first axis, such that a ratio of the first curvature and the second curvature matches the imaging sensor aspect ratio.

8. The apparatus of claim 1, wherein the planar surface of each of the optical elements is substantially rectangular.

9. An apparatus comprising:
   a housing enclosure having an aperture formed therein;
   a light source disposed inside the housing enclosure, the light source including a first light emitting diode (LED) having a first color temperature and a second LED having a second color temperature that is warmer than the first color temperature;

a Fresnel lens disposed in the aperture to collimate light produced by the light source to produce a collimated beam;

a substrate configured to receive the collimated beam through a first surface of the substrate, the first surface contacting the Fresnel lens, the substrate further configured to direct the collimated beam out of the substrate through a second surface of the substrate, the second surface being opposite the first surface; and a lens array configured to mix the collimated beam to produce a diverging light output that has a generally uniform color temperature, the lens array comprising a plurality of optical elements arranged on the substrate, each optical element including a respective planar surface that contacts the second surface of the substrate, each optical element further including a convex surface opposite the respective planar surface.

10. The apparatus of claim 9, the lens array producing light with a third color temperature that is different from the first and second color temperatures.

11. The apparatus of claim 9, wherein each optical element is configured to produce a respective illumination spot that substantially overlaps with another respective illumination spot produced by at least one other optical element when the illumination spot and the other respective illumination spot are projected on a target plane.

12. The apparatus of claim 11, wherein the target plane is located at a distance from the lens array, the distance being at least ten times greater than a dimension of the lens array.

13. The apparatus of claim 9, further comprising an imaging sensor having an imaging sensor aspect ratio, wherein each optical element is configured to produce a respective illumination spot having an aspect ratio that is substantially the same as the imaging sensor aspect ratio.

14. The apparatus of claim 9, wherein the convex surface of any of the optical elements has a first curvature along a first axis and a second curvature along a second axis that is orthogonal to the first axis, the second curvature being different from the first curvature.

15. The apparatus of claim 9, further comprising an imaging sensor having an imaging sensor aspect ratio, wherein the second surface of any of the optical elements has a first curvature along a first axis and a second curvature along a second axis that is orthogonal to the first axis, such that a ratio of the first curvature and the second curvature matches the imaging sensor aspect ratio.

16. The apparatus of claim 9, wherein the planar surface of each of the optical elements is substantially rectangular.

17. An apparatus comprising:

a first light source for producing light having a first color temperature;

a second light source for producing light having a second color temperature that is cooler than the first color temperature;

a first Fresnel lens configured to collimate light produced by the first light source to produce a first collimated beam;

a first substrate configured to receive the first collimated beam through an incident surface of the first substrate, the incident surface contacting the first Fresnel lens, the first substrate further configured to direct the first collimated beam out of the first substrate through an exiting surface of the first substrate, the exiting surface of the first substrate being opposite the incident surface of the first substrate;

a first lens array configured to mix the first collimated beam to produce a first diverging light output that has the first color temperature, the first lens array comprising a plurality of first optical elements arranged on the first substrate, each first optical element including a respective first planar surface that contacts the exiting surface of the first substrate, each first optical element further including a respective first convex surface opposite the respective first planar surface;

a second Fresnel lens configured to collimate light produced by the second light source to produce a second collimated beam;

a second substrate configured to receive the second collimated beam through an incident surface of the second substrate, the incident surface contacting the second Fresnel lens, the second substrate further configured to direct the second collimated beam out of the second substrate through an exiting surface of the second substrate, the exiting surface of the second substrate being opposite the incident surface of the second substrate; and a second lens array configured to mix the second collimated beam to produce a second diverging light output, the second lens array comprising a plurality of second optical elements arranged on the second substrate, each second optical element including a respective second planar surface that contacts the exiting surface of the second substrate, each second optical element further including a respective second convex surface opposite the respective second planar surface, each first optical element being configured to produce a respective illumination spot that substantially overlaps with another respective illumination spot produced by any of the second optical elements when the illumination spot and the other respective illumination spot are projected on a target plane.

18. The apparatus of claim 17, wherein the target plane is located at a distance from the first lens array, the distance being at least ten times greater than a dimension of one of the first lens array and the second lens array.

19. The apparatus of claim 17, further comprising an imaging sensor having an imaging sensor aspect ratio, wherein:

each first optical element is configured to produce a respective first illumination spot having a first aspect ratio that is substantially the same as the imaging sensor aspect ratio, and each second optical element is configured to produce a respective second illumination spot having a second aspect ratio that is substantially the same as the imaging sensor aspect ratio.

* * * * *